(12) United States Patent
Weerasooriya et al.

(10) Patent No.: US 8,188,012 B2
(45) Date of Patent: May 29, 2012

(54) PROCESS OF USING HARD BRINE AT HIGH ALKALINITY FOR ENHANCED OIL RECOVERY (EOR) APPLICATIONS

(75) Inventors: Upali P. Weerasooriya, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 12/879,231

(22) Filed: Sep. 10, 2010

(65) Prior Publication Data

US 2011/0059873 A1    Mar. 10, 2011

Related U.S. Application Data

(60) Provisional application No. 61/241,191, filed on Sep. 10, 2009, provisional application No. 61/243,025, filed on Sep. 16, 2009.

(51) Int. Cl.
*C09K 8/68* (2006.01)
*E21B 43/16* (2006.01)

(52) U.S. Cl. .............. 507/203; 166/305.1; 507/219; 507/225; 507/239; 507/260; 507/267

(58) Field of Classification Search .............. 507/203, 507/219, 225, 239, 260, 267; 166/305.1
See application file for complete search history.

(56) References Cited

U.S. PATENT DOCUMENTS

| | | | |
|---|---|---|---|
| 3,943,160 | A | 3/1976 | Farmer, III et al. |
| 4,004,638 | A | 1/1977 | Burdyn et al. |
| 4,331,543 | A | 5/1982 | Wilson et al. |
| 4,359,093 | A | 11/1982 | Gernard |
| 4,976,315 | A | 12/1990 | Prukop et al. |
| 2008/0312108 | A1 | 12/2008 | Berger et al. |
| 2011/0059872 | A1 | 3/2011 | Weerasooriya et al. |

OTHER PUBLICATIONS

Adkins. S., et al. "A New Process for Manufacturing and Stabalizing High-Performance EOR Surfactants at Low Cost for High-Temperature, High Salinity Oil Raservoirs." Paper SPE 120923, presented at the 2010 SPE Improved Oil Recovery Symposium. Tulsa, Oklahoma, Apr. 24-26, 2010.

Daoshan, et al: "The Effect of biosurfactant on the interfactial tension and adsorption loss of surfactant in ASP flooding"; Colloids and Surfaces A: Physiochem. Eng. Aspects 244, pp. 53-60, no month, 2004: Elsevier Science B.V., NL.

Deng, S, et al.; Effects of alkaline/surfactant/polymer on stability of oil droplets in produced water from ASP flooding; Cooloids and Surfaces A: Physiochem. Eng. Aspects 211, pp. 275-284: no month, 2001; Elsevier Science B. V; NL.

Flaaten, A, "Experimental Study of Microemulsion Characterization and Optimization in Enhanced Oil Recovery: A Design Approach for Reservoirs with High Salinity and Hardness," Thesis, The University of Texas at Austin (Dec. 2007): US.

Healy, R.N., et al. "Multiphase Microemaision Systems," Society of Petroleum Engineers Journal, 16(3), Jun. 1976; pp. 147-160; Society of Petroleum Engineers; US.

(Continued)

*Primary Examiner* — Timothy J. Kugel (74) *Attorney, Agent, or Firm* — Kelly Kordzik; Matheson Keys Garsson & Kordzik PLLC (57) ABSTRACT

The present invention describes the use of EDTA and/or alkali treated hard brine at high pH for making ASP formulations for EOR applications.

49 Claims, 4 Drawing Sheets

OTHER PUBLICATIONS

Holm et al.; Improved Micellar-Polymer Flooding with High pH chereicais; SPE 7583; Society of Petrolernium Engineers; Oct. 1-3, 1978; American Institute of Mining, Metallurgical and Petroleum Engineeting, Inc.; US.

Hun, C.. "Interfacial Tensions and Solubilizing Abiiity of a Micioeniiilsion Pliase That Coexists With Oil and Brine," Journal of Colloid and Interface Science, 71(2), Sep. 1979; pp. 409-426; Academic Press, Inc.; US.

Jackson, A.C., 2006, "Experimental Study of the Benefits of Sodium Carbonate on Surfactants for EOR," Thesis, The University of Texas at Austin (Dec. 2006).

Korean ISA; International Search Report & Written Opinion for PCT/US2010/048353; Jun. 3, 2011; KR.

Talley, L.D, "Hydrolytic Stability of Alkylethoxy Sulfates," SPE Reservoir Engineering, 3(1); Feb. 1988; pp. 235-242; Society of Petroleum Engineers; US.

Yang, N., et al., "Low-Cost, High Performance Chemicals for Enhanced Recovery," Paper SPE 129978, presented at the 2010 SPE Improved Oil Recover Symposium, Tulsa, Oklahoma. Apr. 24-28, 2010.

Zhao, Ping, "Development of High-Performance Surfactants for Difficult Oils," Thesis, The University of Texas at Austin; Dec. 2007: US.

Hirasaki, G.J., "Application of the Theory of Multicomponent, Multiphase Displacement to Three-Component, Two-Phase Surfactant Flooding," Apr. 2008; pp. 191-204, SPEJ, US.

Johnson, C.E., "Status of Caustic and Emulsion Methods," Jan. 1976, pp. 85-92, JPT, US.

Nelson. R.C., et al, "Co-Surfactant Enhanced Alkaline Flooding," 1984, SPE 12672, US.

FIG. 1

0.33% C16-17-7PO-SO4, 0.33% C15-18 IOS, 0.33% C32-7PO-18EO-SO4, 0.5% TEGBE, 3.5% EDTA Na4

PROCESS OF USING HARD BRINE AT HIGH ALKALINITY FOR ENHANCED OIL RECOVERY (EOR) APPLICATIONS

CROSS-REFERENCE TO RELATED APPLICATIONS

This application for patent claims the benefit of priority from U.S. Provisional Patent Application Ser. No. 61/241,191, filed Sep. 10, 2009, entitled "Process of Using Hard Brine At High Alkalinity For Enhanced Oil Recovery (EOR) Applications," which provisional patent application is commonly assigned to the assignee of the present invention, and which disclosure is considered part of and is incorporated by reference in its entirety in the disclosure of this application.

This Application for patent also claims the benefit of priority from U.S. Provisional Patent Application Ser. No. 61/243,025, filed Sep. 16, 2009, entitled "Compositions And Methods For Controlling The Stability Of Ethersulfate Surfactants At Elevated Temperatures," which provisional patent application is commonly assigned to the assignee of the present invention, and which disclosure is considered part of and is incorporated by reference in its entirety in the disclosure of this application.

TECHNICAL FIELD OF THE INVENTION

The present invention relates in general to the field of enhanced oil recovery, and more particularly, the use of alkaline-surfactant-polymer (ASP) chemicals in hard brine.

BACKGROUND OF THE INVENTION

Without limiting the scope of the invention, its background is described in connection with the compositions and compounds for oil recovery applications.

United States Patent Application No. 20080312108 (Berger and Berger, 2008) discloses compositions and process for recovering of oil from subterranean oil-bearing reservoirs consisting of green non-toxic biodegradable strong alkali metal salt of polymerized weak acids, one or more surfactants, an aqueous fluid, and optionally one or more mobility control agents and optionally one or more co-solvents. Such compositions are injected into the reservoir through one or more injection wells and assist in recovering trapped oil through one or more producing wells. The compositions and the process described in the invention offer the advantage of improved compatibility with unsoftened waters, surfactants, and various mobility control agents. The green non-toxic, biodegradable properties of the alkali makes it particularly suitable for environmentally sensitive applications such as offshore and inland lakes U.S. Pat. No. 4,004,638 issued to Burdyn et al. (1977) teaches recovery of oil from subterranean oil reservoirs by water flooding employing an alkaline agent and a sulfonate surfactant. An aqueous initiation slug containing an alkaline agent selected from the group consisting of alkali metal and ammonium hydroxides is injected into the reservoir via a suitable injection system. Thereafter an aqueous surfactant slug is injected into the reservoir behind the initiation slug. The surfactant slug contains a sulfonate surfactant and an alkaline agent. Subsequent to injection of the surfactant slug, an aqueous flooding medium is injected in order to displace the oil within the reservoir to a production system from which it is recovered. A portion of the flooding medium may contain a thickening agent for mobility control purposes.

A large number of petroleum reservoirs have some hardness (divalent cations) in the water, and thus pose a great threat to the aqueous stability of the chemicals injected. Divalent cations precipitate with alkali, surfactant and polymer and result in plugging during injection. In addition, hardness has a dominant impact on phase behavior especially at low concentration of surfactant (Nelson, 1984) and this can cause high surfactant retention by ion exchange between the surfactant, brine, and clay (Hill, et al., 1977; Hirasaki, 1981). Therefore, extra measures are taken to test the compatibility of the injection chemicals with brine. One measure is softening of injection water, which is an expensive process that in some cases is not feasible.

SUMMARY OF THE INVENTION

The present invention describes the use of EDTA $Na_4$ (Ethylenediamine tetracetic acid, tetra sodium salt) and similar agents as both a chelating agent to prevent precipitation of divalent cations such as $Ca^{++}$ and $Mg^{++}$ at high pH and as an alkali to increase the pH to values needed for enhanced oil recovery by ASP flooding and similar EOR methods that reduce the interfacial tension, alter the wettability of the formation, increase the viscosity of the injected brine, lower surfactant adsorption to the rock, and otherwise cause more of the oil to be mobilized and flow to the producers by a variety of well known and well established mechanisms. Oilfield brines must first be softened before conventional alkalis such as sodium carbonate can be used in ASP flooding processes whereas EDTA can be used in hard brines. Also, the EDTA increases the pH to sufficiently high values that Ether Sulfates (ES) are stable at high temperature and thus can be used for EOR applications, which is another novel benefit of its use.

In general, in one aspect, the invention features a composition for treating a hydrocarbon-bearing formation. The composition includes an alkaline-surfactant-polymer (ASP) solution in water and an agent that is a chelating agent and an alkali. The water is hard water or hard brine.

Implementations of the invention can include one or more of the following features:

The water can be hard brine.

The composition can be made by the process of mixing in the hard brine an alkaline agent, a surfactant, a polymer and the agent.

The agent can be mixed with the hard brine before adding the surfactant and the polymer.

The agent can be ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), malic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, or succinic acid.

The agent can be EDTA $Na_4$.

The ASP solution can include an anionic surfactant. The anionic surfactant can be ether sulfates or a salt thereof. The surfactant can be ether sulfate.

The ASP solution can include a high molecular weight water-soluble polymer selected from the group consisting of polyacrylamides, co-polymers of polyacrylamides, partially hydrolyzed polyacrylamide (HPAM) polymers, and combinations thereof.

The ASP solution can (i) include a surfactant that is an ether sulfate and (ii) a polymer that is a high molecular weight water-soluble polymer.

The EDTA Na$_4$ can have a concentration between about 0.1 wt % to about 10 wt % of the EDTA Na$_4$ in the water.

The water can include 3.5 wt % of the EDTA Na$_4$.

The water can include divalent cations and the weight ratio of EDTA to the divalent cations is at least about 9:1.

The pH of the composition can range from 9 to 13. The pH of the composition can be from 10.5 to 11.

The composition can be at a temperature from 25 to 120° C.

The composition can be a non-chelating amine or an inorganic alkaline agent providing alkalinity. The non-chelating amine can be dimethylaminopropylamine. The dimethylaminopropylamine can be operable to provide (a) a pH of around 10.2 at a 1% level in deionized water and (b) a pH of around 10.4 at a 2% level in deionized water.

The water can include divalent cations that are Ca$^{++}$ and/or Mg$^{++}$. The non-chelating amine can be operated to produce an alkalinity in the water in the absence of Ca and Mg precipitation.

The non-chelating amine can include an ethanol amine, a di- and tri ethanol amine, a polyalkylene polyamine, a diethylene triamine (DETA), a triethylenetetramine (TETA), an alkoxylated derivative thereof, or a combination thereof.

In general, in another aspect, the invention features a method for making a composition for use in treating a hydrocarbon-bearing formation. The method includes combining an alkaline agent, a surfactant, and a polymer in water to form an alkaline-surfactant-polymer (ASP) solution in the water. The water is hard water or hard brine. The method further includes adding an agent to the water. The agent is a chelating agent and an alkali. The method further includes forming the composition from the combination of the alkaline agent, the surfactant, the polymer, and the agent.

Implementations of the invention can include one or more of the following features:

The water can be a hard brine. The agent can be added to the hard brine before combining the surfactant and the polymer.

The agent can be EDTA NA$_4$.

The surfactant can be an anionic surfactant and the polymer can have a high molecular weight water-soluble polymer.

In general, in another aspect, the invention features a method of treating a hydrocarbon-bearing formation to recover oil. The method includes selecting a composition that includes an alkaline-surfactant-polymer (ASP) solution in water. The water is hard water or hard brine. The composition further includes that the agent is a chelating agent and an alkali. The method further includes injecting the composition into the hydrocarbon bearing formation at a temperature from 25 to 120° C.

Implementations of the invention can include one or more of the following features:

The water can be hard brine.

The agent can be ethylenediaminetetraacetic acid (EDTA), ethylenediamine tetracetic acid tetra sodium salt (EDTA Na$_4$), EDTA salts, acrylic polymers, ascorbic acid, tetrasodium iminodisuccinate, citric acid, dicarboxymethylglutamic acid, ethylenediaminedisuccinic acid (EDDS), malic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, or succinic acid.

The ASP solution can include a high molecular weight water-soluble polymer selected from the group consisting of polyacrylamides, co-polymers of polyacrylamides, or partially hydrolyzed polyacrylamide (HPAM) polymers.

The ASP solution can include an anionic surfactant.

The surfactant can be an ether sulfate.

The water can include at least 3.5 wt % of the chelating agent EDTA Na$_4$.

The water can include divalent cations and the weight ratio of EDTA to the divalent cations is at least about 9:1.

The agent is at a concentration between about 0.1 wt % to about 10 wt % of the agent in the water.

The pH of the composition ranges can be from 9 to 13.

The pH of the composition can be 10.5.

The composition can further include a non-chelating amine added in a quantity such that the composition has a pH in the range of 9 to 13.

The non-chelating amine can include dimethylaminopropylamine or a dimethylaminopropylamine. The non-chelating amine can also be operable to provide (a) a pH of around 10.2 at a 1% level in deionized water and (b) a pH of around 10.4 at a 2% level in deionized water.

The non-chelating amine can be operable to increase the alkalinity of the water without any Ca and Mg precipitation.

The non-chelating amine can be an ethanol amine, a di- and tri ethanol amine, a polyalkylene polyamine, a diethylene triamine (DETA), a triethylenetetramine (TETA), or a alkoxylate thereof.

In general, in another aspect, the invention features a composition for treating a hydrocarbon-bearing formation. The composition includes an alkaline-surfactant-polymer (ASP) solution in water and a non-chelating amine. The water is hard water or hard brine. The non-chelating amine can be added in a quantity such that the composition has a pH in the range from 9 to 13.

Implementations of the invention can include one or more of the following features:

The non-chelating amine can include dimethylaminopropylamine. The dimethylaminopropylamine can be used to provide (a) a pH of around 10.2 at a 1% level in deionized water and (b) a pH of around 10.4 at a 2% level in deionized water.

The non-chelating amine can be used to increase the alkalinity of the water without any Ca and Mg precipitation.

The non-chelating amine can be an ethanol amine, a di- and tri ethanol amine, a polyalkylene polyamine, a diethylene triamine (DETA), a triethylenetetramine (TETA), or an alkoxylates thereof.

In general, in another aspect, the invention features a method of treating a hydrocarbon-bearing formation to recover oil that includes selecting a composition. The composition includes an alkaline-surfactant-polymer (ASP) solution in water. The water is s hard water or brine. The composition selected further includes a non-chelating amine added in a quantity such that the composition has a pH in the range from 9 to 13. The method further includes injecting the composition into the hydrocarbon bearing formation at a temperature from 25 to 120° C.

Implementations of the invention can include one or more of the following features:

The dimethylaminopropylamine can be used to provide (a) a pH of around 10.2 at a 1% level in deionized water and (b) a pH of around 10.4 at a 2% level in deionized water.

The non-chelating amine can be used to increase the alkalinity of the water without any Ca and Mg precipitation.

The non-chelating amine can be selected from an ethanol amine, a di- and tri ethanol amine, a polyalkylene polyamine, a diethylene triamine (DETA), a triethylenetetramine (TETA), and an alkoxylate thereof.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention describes the use of EDTA Na$_4$ (Ethylenediamine tetracetic acid, tetra sodium salt) and similar agents as both a chelating agent to prevent precipitation of divalent cations such as Ca$_4$+ and Mg++ at high pH and as an alkali to increase the pH to values needed for enhanced oil recovery by ASP flooding and similar EOR methods. Oilfield brines must first be softened before conventional alkalis such as sodium carbonate can be used in ASP flooding processes whereas EDTA can be used in hard brines. Also, the EDTA increases the pH to sufficiently high values that Ether Sulfates (ES) are stable at high temperature and thus can be used for EOR applications, which is another novel benefit of its use. There are limitations to the use of hydrolyzed polyacrylamde polymers and similar anionic polymers at high temperature in hard bines since these polymers will also precipitate above certain limits of hydrolysis and hardness unless cations such as Ca$^{++}$ and Mg$^{++}$ are sequestered.

The water available for making ASP solutions and similar EOR solutions such as alkaline surfactant solutions and alkali-polymer solutions is hard brine in most oil fields. This is typically the cheapest water available in sufficient volumes for oilfield use and to remove the hardness ions such as calcium (Ca) and magnesium (Mg) from this water in a softening process adds significant cost to the field operation and can also present barriers to its use because of logistical constraints on offshore platforms and in remote areas and so forth. The present inventors have discovered that a chelating agent such as EDTA Na$_4$ (Ethylenediamine tetracetic acid, tetra sodium salt) can be used to overcome the problems of precipitations at high pH. Moreover these chelants introduce a high pH that would be ideal for the temperature stability of Ether Sulfates, which vastly broadens the scope for surfactant selection on a cost/performance basis. Without this process, the surfactant selection will be limited to more expensive sulfonate surfactants and similar surfactants that do not hydrolyze at high temperature. There are limitations to the use of hydrolyzed polyacrylamide polymers and similar anionic polymers at high temperature in hard brines since these polymers will also precipitate above certain limits of hydrolysis and hardness. Moreover, one would lose the ability to generate "soaps" in-situ from "active" oils. Other chelants that show similar performance are NTA (Nitrilo triacetic acid, trisodium salt) and glutamic acid and derivatives.

After chelation (with the chelation agent), the divalent cations remain in the solution but show no tendency to react with surfactants to precipitate. EDTA-Na$_4$ has shown excellent performance, however, others sequestering agents such as tetrasodium pyrophosphate (TSPP) and nitrilo triacetic acid (NT A) etc. can be employed. A weight ratio of at least about 9:1 EDTA per divalent cations present in the hard brine is typically utilized. However, it has been determined that this ratio increases as the temperature increases since the elevated temperature accelerates the reaction between hydroxyl ions in the water to precipitate with divalent cations.

For example, calculated requirement of EDTA-Na$_4$ to sequester 650 ppm Ca$^{++}$ and 2110 ppm Mg$^{++}$ is 24,350 ppm. However, the calculated value at 100° C. is determined to be 35,000 ppm at an adjusted pH of 10.5-11. Since most reservoir brines contain more than one type of divalent cation (Ca$^{++}$/Mg$^{++}$), the typical EDTA-Na$_4$ requirement can be determined at each temperature. Furthermore, the impact on the phase behavior of the additional Na$^+$ ions from the EDTA-Na$_4$ was determined to be equivalent to Na$_2$CO$_3$. Once the correct amount of EDTA chelant is present, addition of other alkali such as sodium carbonate is possible without any divalent ion precipitation.

The process of the present invention allows the use of high alkalinity with hard water, thereby making it feasible to use ether sulfates (ES) at high temperatures. Also, if the oil is active, under high alkalinity, in situ generation of soaps takes place. Consequently, lower levels of surfactants are needed to recover the oil.

Because of its high pH, EDTA-Na$_4$ it functions as an alkaline agent. It raises the pH of the injection fluid to sufficiently high levels where natural soaps can be generated from naphthelenic acids in reactive crude oils (Johnson, 1976). Also, by increasing pH, surfactant adsorption is greatly reduced, and the sulfate surfactants can be stabilized at high temperature reservoir conditions. In addition, EDTA-Na$_4$ can be used in the presence of carbonate ions without precipitating them as carbonate with divalent ions. Since EDTA-Na$_4$ is relatively expensive, the lowest amount of EDTA-Na$_4$ for complex divalent ions and the remaining alkalinity can be provided by Na$_2$CO$_3$.

EDTA-Na$_4$ (and other chelating agents that are also an alkali) is beneficial in EOR/ASP flooding, and such multifunctional character is attractive for a large percentage of reservoir conditions. Such benefits include enhanced stability for polymer and surfactants in hard brines.

The following definitions of terms apply throughout the specification and claims.

For methods of treating a hydrocarbon-bearing formation and/or a well bore, the term "treating" includes placing a chemical (e.g., an anionic surfactant or water-soluble polymer) within a hydrocarbon-bearing formation using any suitable manner known in the art (e.g., pumping, injecting, pouring, releasing, displacing, spotting, or circulating the chemical into a well, well bore, or hydrocarbon-bearing formation).

The term "polymer" refers to a molecule having a structure that essentially includes the multiple repetition of units derived, actually or conceptually, from molecules of low relative molecular mass. The term "polymer" includes "oligomer".

The term "bonded" refers to having at least one of covalent bonding, hydrogen bonding, ionic bonding, Van Der Waals interactions, pi interactions, London forces, or electrostatic interactions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force). This term is not pertinent to enhanced oil recovery. It applies to near wellbore treatments such as the 3M treatment, but here the idea is to flood the entire reservoir with chemical solutions to mobilize and displace the oil to the production wells.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above.

Figure 1:
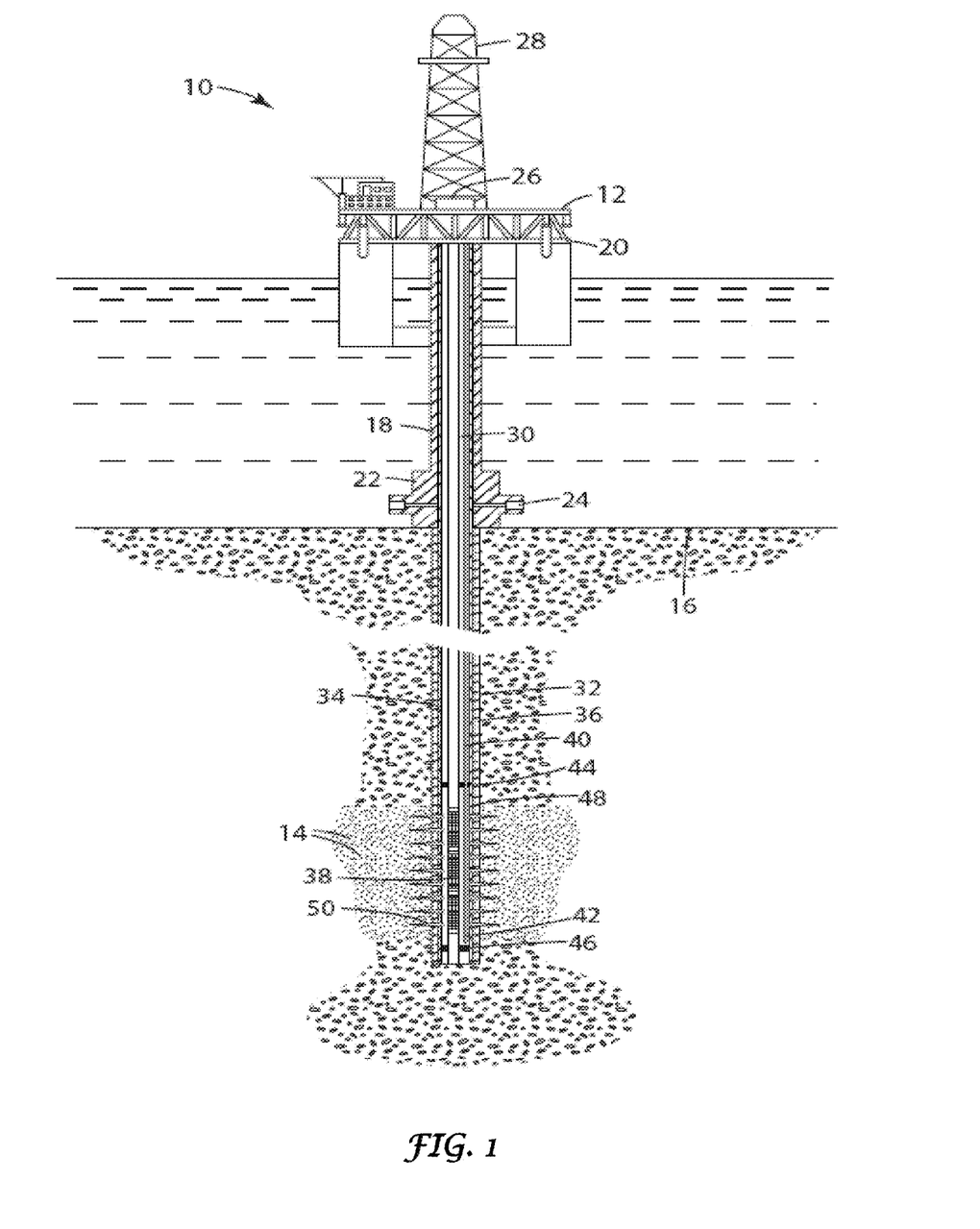
FIG. 1 is a schematic illustration of an offshore oil platform with facilities for injecting chemical solutions into the reservoir for the purpose of flooding the reservoir to enhance the oil recovery according to some embodiments of the present invention.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Phase Behavior Procedures

Phase Behavior Screening: Phase behavior experiments have been used to characterize chemicals for EOR. There are many benefits in using phase behavior as a screening method. Phase Behavior studies are used to determine: (1) the effect of electrolytes; (2) oil solubilization, IFT reduction, (3) microemulsion densities; (4) surfactant and microemulsion viscosities; (5) coalescence times; (6) identify optimal surfactant-cosolvent formulations; and/or (7) identify optimal formulation for coreflood studies.

Thermodynamically stable phase can form with oil, water and surfactant mixtures. Surfactants form micellar structures at concentrations above the critical micelle concentration (CMC). The emulsion coalesces into a separate phase at the oil-water interface and is referred to as a microemulsion. A microemulsion is a surfactant-rich distinct phase consisting of surfactant, oil and water and possibly co-solvents and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (surfactant, alcohol, electrolyte), oil, which is sometimes characterized by its equivalent alkane carbon number (EACN), and surfactant structure, which is sometimes characterized by its hydrophilic-lipophilic balance (HLB). The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity ($S^*$).

Interfacial Tension Determination: Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \tag{1}$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of surfactants, co-surfactants, co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment: Phase behavior experiments were created with the following materials and equipment.

Mass Balance: Mass balances were used to measure chemicals for mixtures and determine initial saturation values of cores.

Water Deionizer: Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about ½ inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations: The oil and water solubilization ratios are calculated from interface measurements taken from phase behavior pipettes. These interfaces are recorded over time as the mixtures approached equilibrium and the volume of any macroemulsions that initially formed decreased or disappeared. The procedure for creating phase behavior experiments will be discussed later.

Oil Solubilization Ratio: The oil solubilization ratio is defined as the volume of oil solubilized divided by the volume of surfactant in microemulsion. All the surfactant is presumed to be in the emulsion phase. The oil solubilization ratio is applied for Winsor type I and type III behavior. The volume of oil solubilized is found by reading the change between initial aqueous level and excess oil (top) interface level. The oil solubilization parameter is calculated as follows:

$$\sigma_O = \frac{V_O}{V_S} \quad (2)$$

$\sigma_o$ = oil solubilization ratio $V_o$ = volume of oil solubilized $V_s$ = volume of surfactant Water Solubilization Ratio: The water solubilization ratio is defined as the volume of water solubilized divided by the volume of surfactant in microemulsion. All the surfactant is presumed to be in the emulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_W = \frac{V_W}{V_S} \quad (3)$$

$\sigma_w$ = water solubilization ratio $V_w$ = volume of water solubilized

Optimum Solubilization Ratio: The optimum solubilization ratio occurs where the oil and water solubilization is equal. The coarse nature of phase behavior screening often does not include a data point at optimum, so the solubilization curves are drawn for the oil and water solubilization and the intersection of these two curves is defined as the optimum. The following is true for the optimum solubilization ratio:

$$\sigma_o = \sigma_\omega = \sigma^* \quad \sigma^* = \text{optimum solubilization parameter} \quad (4)$$

Phase Behavior Methodology: The methods for creating, measuring and recording observations are described in this section. Scans are made using a variety of electrolyte mixtures described below. Oil is added to most aqueous surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of Samples: Phase Behavior Samples are Made by First Preparing surfactant stock solutions and combining them with brine stock solutions in order to observe the behavior of the mixtures over a range of salinities. All the experiments are created at or above 0.1 wt % active surfactant concentration, which is above the typical CMC of the surfactant.

Solution Preparation: Surfactant stocks are based on active weight-percent surfactant (and co-surfactant when incorporated). The masses of surfactant, co-surfactant, co-solvent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Surfactant Stock: The chemicals being tested are first mixed in a concentrated stock solution that usually consisted of a primary surfactant, co-solvent and/or co-surfactant along with de-ionized water. The quantity of chemical added is calculated based on activity and measured by weight percent of total solution. Initial experiments are at about 1-3% active surfactant so that the volume of the middle microemulsion phase would be large enough for accurate measurements assuming a solubilization ratio of at least 10 at optimum salinity.

Polymer Stock: Often these stocks were quite viscous and made pipetting difficult so they are diluted with de-ionized water accordingly to improve ease of handling. Mixtures with polymer are made only for those surfactant formulations that showed good behavior and merited additional study for possible testing in core floods. Consequently, scans including polymer are limited since they are done only as a final evaluation of compatibility with the surfactant.

Pipetting Procedure: Phase behavior components are added volumetrically into 5 ml pipettes using an Eppendorf Repeater Plus or similar pipetting instrument. Surfactant and brine stocks are mixed with DI water into labeled pipettes and brought to temperature before agitation. Almost all of the phase behavior experiments are initially created with a water oil ratio (WOR) of 1:1, which involved mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition: Consideration had to be given to the addition of the components since the concentrations are often several fold greater than the final concentration. Therefore, an order is established to prevent any adverse effects resulting from surfactant or polymer coming into direct contact with the concentrated electrolytes. The desired sample compositions are made by combining the stocks in the following order: (1) Electrolyte stock(s); (2) De-ionized water; (3) Surfactant stock; (4) Polymer stock; and (5) Crude oil or hydrocarbon. Any air bubbles trapped in the bottom of the pipettes are tapped out (prior to the addition of surfactant to avoid bubbles from forming).

Initial Observations: Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing: The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times provide adequate mixing. Tubes are observed for low tension upon mixing by looking at droplet size and how uniform the mixture appeared. Then the solutions are allowed to equilibrate over time and interface levels are recorded to determine equilibration time and surfactant performance.

Measurements and Observations: Phase behavior experiments are allowed to equilibrate in oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces: The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

If the interfaces are hard to read, a 365 nm black light is used to illuminate the microemulsion phase and to improve the contrast between the microemulsion and the excess oleic phase.

Studies with Ethylene Diamine Tetracetic Acid Tetrasodium (EDTA $Na_4$) to use Ether Sulfate surfactants with high salinity, hard brine at 100° C.: The composition of brine used in the studies of the present invention is listed in Table 1.

TABLE 1

| Composition of the Brine used. | |
|---|---|
| Ions | Conc. (ppm) |
| Na | 18300 |
| Ca | 650 |
| Mg | 2110 |
| $SO_4$ | 4290 |
| Cl | 32200 |
| $HCO_3$ | 120 |
| TDS | 57670 |

In an attempt to use the Sulfate surfactants for the phase behavior experiments at 100° C., the present inventors employed EDTA $Na_4$ in the surfactant formulations. As the brine was hard, Sodium Carbonate (or NaOH) cannot be used to raise the pH for stabilizing Sulfate surfactants. Thus, the inventors employed EDTA $Na_4$ as a Chelating agent to negate the effect of divalent ions and also to stabilize the sulfate surfactants.

Materials, Methods and Results: Before the inventors could use EDTA $Na_4$ in the surfactant formulations, the inventors calculated a minimum EDTA $Na_4$ concentration required to keep the aqueous solution (Brine+DI+EDTA $Na_4$) clear both at room temperature and 100° C. For determining that minimum wt % EDTA $Na_4$ required, the inventors performed an EDTA $Na_4$ scan (varying wt %) keeping the brine strength at 100%.

Study I: An EDTA $Na_4$ scan was done from 2 wt % to 6 wt % EDTA $Na_4$. A clear solution was seen from 3 wt % EDTA $Na_4$ at room temperature, but all the samples turned cloudy at 100° C. within 12 hr.

Study II: The theoretical amount of EDTA $Na_4$ is calculated based on the Calcium and Magnesium ion concentration in the brine, and it was found to be approximately 2.8 wt %. Hence the inventors performed a Salinity scan from 28000 TDS to 60000 TDS with 3 wt % EDTA $Na_4$ and the brine used was pre-filtered (using 12.5 cm Whatman filter paper) to remove any sulfate precipitates. But the inventors were able to see a clear solution only up to 28000 TDS.

The same was observed even after repeating the same experiment with 6 wt % EDTA $Na_4$. This is almost the double the theoretical amount of EDTA $Na_4$ required.

Study III: Again an EDTA $Na_4$ scan was done from 2 wt % to 4 wt % with 100% brine with the same filtered brine but this time the pH was lowered from 12 to around 10.5 after the addition of EDTA $Na_4$ (because the excess hydroxyl ions at high pH was precipitating with $Ca^{++}$ and $Mg^{++}$ before EDTA $Na_4$ can chelate with the divalent ions).

A clear solution was seen from 3.5 wt % EDTA $Na_4$, and all the formulations tested for phase behavior had a 3.5 wt % EDTA $Na_4$. An example of a data recording sheet and a sample calculation is shown below.

presence of oxygen. The use of a complexing agent (EDTA $Na_4$) again mitigates the harmful effect of Fe with and without oxygen on polymer stability, as reflected by viscosity maintenance. For this thermal stability comparison, the solutions were 1250 ppm FP3630 in 3% NaCl with and without $O_2$. For those solutions having EDTA, the concentration was a weight ratio of iron: EDTA equal to 1:20.

TABLE 2

Phase behavior data recording sheet.

| Hydrocarbon | | | | | | | | | | | |
|---|---|---|---|---|---|---|---|---|---|---|---|
| Surfactant | C16-17-7PO—SO4 | | | | | | Hydrocarbon Density | | | g/cc | |
| Co-Surfactant(1) | C15-18 IOS + C32—7PO—18EO—SO4 | | | | | | Total Surfactant Conc. | | 1 | wt% | |
| Co-Solvent | TEGBE | | | | | | Total Alcohol Conc. | | 0.5 | wt % | |
| Surfactant Conc. | 0.333 | | | | | | Polymer Conc. | | 0 | wt % | |
| Co-surf(1) Conc. | 0.667 | | wt % | | | | | | 0 | wt % | |
| t-pent Conc. | | | wt % | | | | WOR | | 1 | | |
| alkali | 3.5% ED | | wt % | | | | | | | | |
| NaCl:CaCl Ratio | | | | | | | Temperature | | 100 | Celcius | |
| | | | | | | | Tube Size | | 5 | mL | |

| Salinity (% of SUTIB) | TDS in ppm | Aqueous Level | Hydrocarbon Level | Top of emulsion | Top Interface | Bottom Interface | Bottom of emulsion | Type | Volume of Oil Solublized (cc) | Volume of Water Solublized (cc) | Oil Sol. Ratio (cc/cc) | Water Sol. Ratio (cc/cc) |
|---|---|---|---|---|---|---|---|---|---|---|---|---|
| | | Jul. 20, 2009 | 3 | days | | | | | | | | |
| 50.00% | 28909 | 2.90 | 0.9 | | 2.80 | | | I | 0.10 | | 4.8 | |
| 60.00% | 34690 | 2.95 | 0.9 | | 2.82 | | | I | 0.13 | | 6.3 | |
| 65.00% | 37581 | 2.92 | 0.9 | | 2.80 | 3.32 | | III | 0.12 | 0.40 | 5.8 | 19.2 |
| 70.00% | 40472 | 2.96 | 0.9 | | 2.84 | 3.20 | | III | 0.12 | 0.24 | 5.9 | 11.8 |
| 75.00% | 43363 | 2.92 | 0.9 | | 2.70 | 3.25 | | III | 0.22 | 0.33 | 10.6 | 15.9 |
| 80.00% | 46254 | 2.92 | 0.9 | | 2.70 | 3.15 | | III | 0.22 | 0.23 | 10.6 | 11.1 |
| 90.00% | 52035 | 2.92 | 0.9 | | 2.70 | 3.05 | | III | 0.22 | 0.13 | 10.6 | 6.2 |
| 100.00% | 57817 | 2.91 | 0.9 | | | | | I | 2.91 | | | |
| 110.00% | 63599 | 2.96 | 0.9 | | | | | I | 2.96 | | | |
| 120.00% | 69380 | 2.92 | 0.9 | | | | | I | 2.92 | | | |

Figure 2:
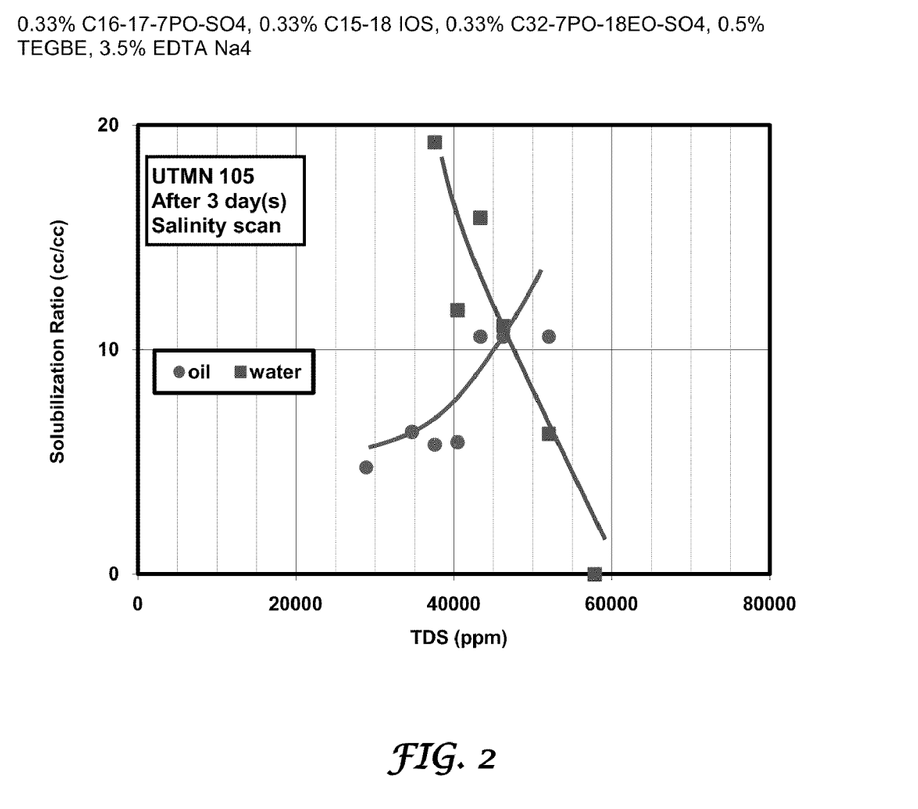
FIG. 2 is a graph of the Phase Behavior result of formulation having sulfate surfactants with EDTA Na$_4$.

Sample Calculation:
Oil Solubilization ratio=Volume of the oil solubilized/Volume of the surfactant
For Salinity 80% brine:
Oil Solubilization ratio=0.23((5−2.92)*(0.01))=10.6 cc/cc
Similarly,
Water Solubilization ratio=Volume of water solubilized/Volume of surfactant
Once the Oil and Water Solubilization ratio are calculated, the phase behavior graph is plotted as shown in FIG. 2.

Figure 3:
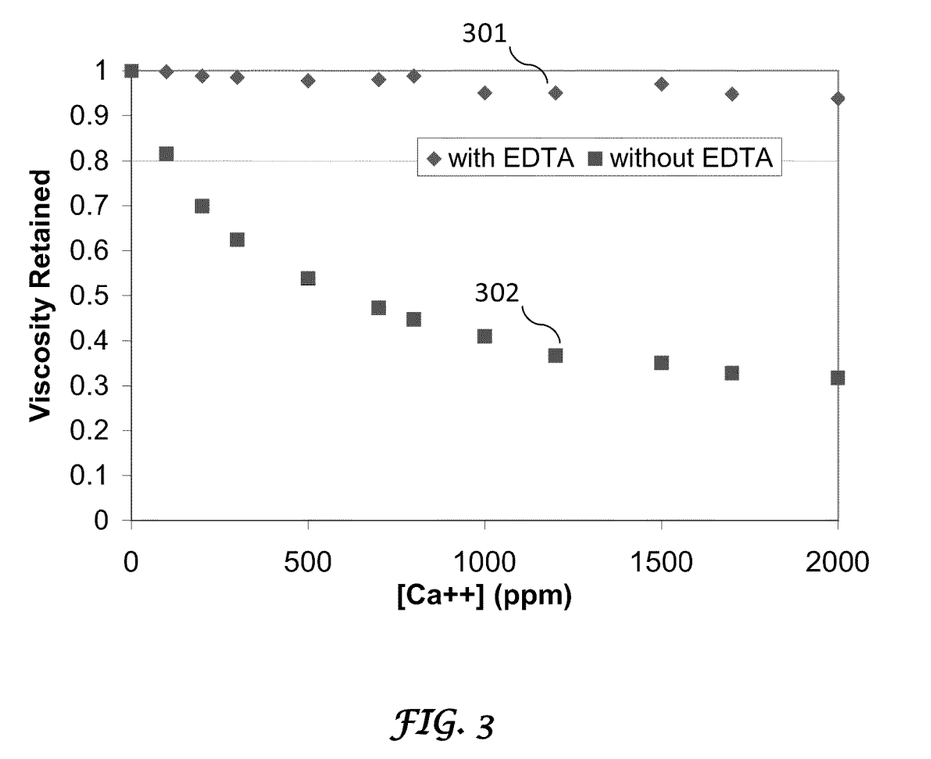
FIG. 3 is a graph showing the use of EDTA for calcium tolerance of the polymer
Figure 4:
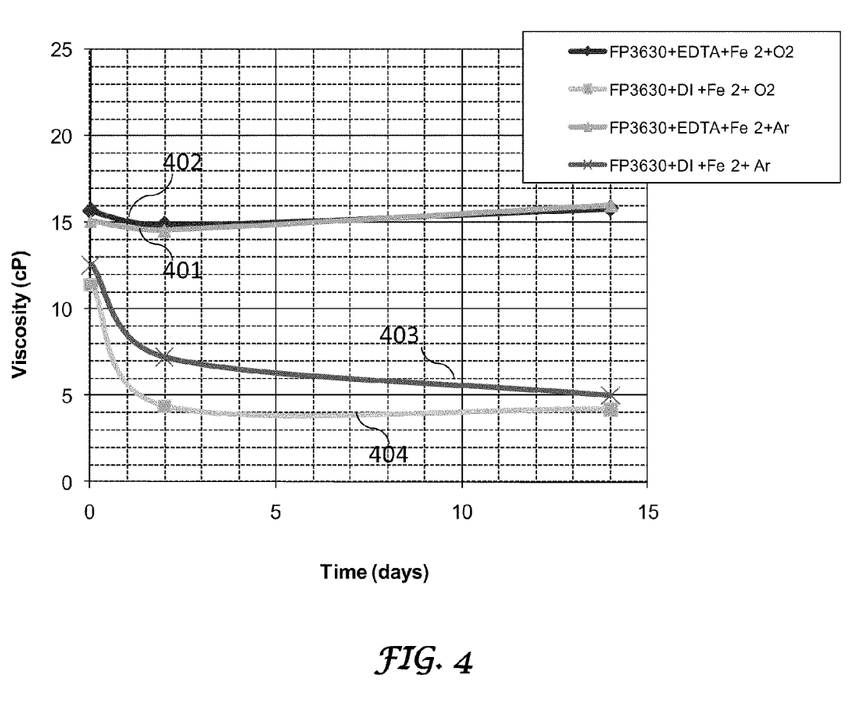
FIG. 4 is a graph showing the use of EDTA for chemical stability of the polymer against Fe in the presence and absence of oxygen.

FIGS. 3 and 4 further show the advantages of adding a sequestering agent/complexing agent (such as EDTA) for polymer stabilization when the solution includes $Ca^{++}$, $Fe^{++}$, and $Fe^{++}$ in the presence of air.

FIG. 3 shows stabilization of hydrolyzed poly acrylamide polymer where the harmful effect of $Ca^{++}$ was mitigated by the use of a sequestering agent (EDTA $Na_4$). For this $Ca^{++}$ tolerance comparison shown in FIG. 3, the solutions contained 2000 ppm PHAMPS (post-hydrolyzed poly acrylamide AN 125), 1.2 wt % NaCl, with and without 4 wt % EDTA; pH=10.75; τ~0.55. The viscosities reflected for both solutions are relative.

As shown in curve 301 of FIG. 3 (solution with EDTA), the viscosity of the solution including the sequestering agent was maintained as the concentration of $Ca^{++}$ was increased. As shown in curve 302 (solution without EDTA), FIG. 3, the viscosity of the solution that did not include the sequestering agent decreased as the concentration of $Ca^{++}$ was increased. Thus, FIG. 3 shows that EDTA almost completely negated the effects of $Ca^{++}$ on polymer stability.

FIG. 4 shows the stabilization of poly acrylamide polymer (FP3630) in the presence of $Fe^{++}$ in argon as well as in the presence of oxygen. The use of a complexing agent (EDTA $Na_4$) again mitigates the harmful effect of Fe with and without oxygen on polymer stability, as reflected by viscosity maintenance. For this thermal stability comparison, the solutions were 1250 ppm FP3630 in 3% NaCl with and without $O_2$. For those solutions having EDTA, the concentration was a weight ratio of iron: EDTA equal to 1:20.

As shown in curve 401 ($Fe^{++}$ with EDTA) and curve 402 ($Fe^{++}$ plus $O_2$ with EDTA), the EDTA stabilized the polymer, i.e., the viscosity of the polymer samples with EDTA remained constant. As shown in curve 403 ($Fe^{++}$ without EDTA) and curve 404 ($Fe^{++}$ plus $O_2$ without EDTA), the viscosity of the polymer sample without EDTA decreased dramatically.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

United States Patent Application No. 20080312108: Compositions and process for recovering subterranean oil using green non-toxic biodegradable strong alkali metal salts of polymerized weak acids.

U.S. Pat. No. 4,004,638: Oil recovery by alkaline-surfactant waterflooding.

Hill, H. J., Helfferich, F. G., Lake, L. W., and Reisberg, J., "Cation Exchange and Chemical Flooding," *JPT*, October, 1336-1338, 1977.

Hirasaki, G. J., 1981. "Application of the Theory of Multicomponent, Multiphase Displacement to Three-Component, Two-Phase Surfactant Flooding," *SPEJ*, April, 191-204, 1981.

Johnson, C. E., "Status of Caustic and Emulsion Methods," *JPT*, Jan., 85-92, 1976.

Nelson, R. C., Lawson, J. B., Thigpen, D. R., and Stegemeier, G. L. "Co-Surfactant Enhanced Alkaline Flooding," SPE 12672, 1984.

What is claimed is:

1. A composition for treating a hydrocarbon-hearing formation, said composition comprising:
   (a) an alkaline-surfactant-polymer (ASP) solution in water, wherein the water is selected from the group consisting of hard water and hard brine;
   (b) an agent that is a chelating agent and an alkali.

2. The composition of claim 1, further comprising a non-chelating amine or an inorganic alkaline agent providing alkalinity.

3. The composition of claim 2, wherein the water comprises divalent cations selected from the group consisting of $Ca^{++}$ and $Mg^{++}$.

4. The composition of claim 3, wherein the non-chelating amine is operable to produce an alkalinity in the water in the absence of Ca and Mg precipitation.

5. The composition of claim 2, wherein
   a. the non-chelating amine comprises dimethyl aminopropylamine, and
   b. the dimethylaminopropylamine is operable to provide (a) a pH of around 10.2 at a 1% level in deionized water and (b) a pH of around 10.4 at a 2% level in deionized water.

6. The composition of claim 2, wherein the non-chelating amine is selected from the group consisting of an ethanol amine, a di-and tri ethanol amine, a polyalkylene polyamine, a diethylene triamine (DETA), a triethylenetetramine (TETA), alkoxylated derivatives thereof, and combinations thereof.

7. The composition of claim 1, wherein the water is hard brine.

8. The composition of claim 7, wherein the composition is made by the process of mixing an alkaline agent, a surfactant, a polymer and the agent in the hard brine to make the composition.

9. The composition of claim 7, wherein the agent is mixed with the hard brine before adding the surfactant and the polymer.

10. The composition of claim 1, wherein the agent is EDTA $Na_4$.

11. The composition of claim 10, wherein the EDTA $Na_4$ is at a concentration between about 0.1 wt % to about 10 wt % of the EDTA $Na_4$ in the water.

12. The composition of claim 10, wherein the water comprises 3.5 wt % of the EDTA $Na_4$.

13. The composition of claim 1, wherein ASP solution comprises an anionic surfactant.

14. The composition of claim 13, wherein the anionic surfactant is selected from the group consisting of ether sulfates and salts thereof.

15. The composition of claim 13, wherein the surfactant is an ether sulfate.

16. The composition of claim 1, wherein the agent is selected from the group consisting of ethylenediaminetetraacetic acid (EDTA), ethylenediamine tetracetic acid tetra sodium salt (EDTA $Na_4$), EDTA salts, acrylic polymers, ascorbic acid, tetrasodium iminodisuccinate, citric acid, dicarboxymethylglutamic acid, ethylenediaminedisuccinic acid (EDDS), malic acid, nitrilotriacetic acid (NTA), nonpolar amino acids, methionine, oxalic acid, phosphoric acid, polar amino acids, arginine, asparagine, aspartic acid, glutamic acid, glutamine lysine, ormithine, siderophores, desferrioxamine B, hydrolysed wool, and succinic acid.

17. The composition of claim 1, wherein the ASP solution comprises a water-soluble polymer selected from the group consisting of polyacrylamides, co-polymers of polyacrylamides, partially hydrolyzed polyacrylamide (HPAM) polymers, and combinations thereof.

18. The composition of claim 1, wherein the ASP solution comprises (i) a surfactant that is an ether sulfate and (ii) a polymer that is a water-soluble polymer.

19. The composition of claim 1, wherein the water comprises divalent cations and the weight ratio of EDTA to the divalent cations is at least about 9:1.

20. The composition of claim 1, wherein the pH of the composition ranges from 9 to 13.

21. The composition of claim 1, wherein the pH of the composition is from 10.5 to 11.

22. The composition of claim 1, wherein the composition is at a temperature from 25 to 120° C.

23. A method of making a composition for use in treating a hydrocarbon-hearing formation, said method comprising the steps of:
  a. combining an alkaline agent, a surfactant, and a polymer in water to form an alkaline-surfactant-polymer (ASP) solution in the water, wherein the water is selected from the group consisting of hard water and hard brine, and
  b. adding an agent to the water, wherein the agent is a chelating agent and an alkali;
  c. forming the composition from the combination of the alkaline agent, the surfactant, the polymer, and the agent.

24. The method of claim 23, wherein water is the hard brine, and the agent is added to the hard brine before combining the surfactant and the polymer.

25. The method of claim 24, wherein agent is EDTA NA$_4$.

26. The method of claim 25, wherein the surfactant is an anionic surfactant and the polymer is a water-soluble polymer.

27. A method of treating a hydrocarbon-bearing formation to recover oil comprising:
  a. selecting a composition comprising
    i. an alkaline-surfactant-polymer (ASP) solution in water, wherein the water is selected from the group consisting of hard water and hard brine, and
    ii. an agent is a chelating agent and an alkali, and
  b. injecting the composition into the hydrocarbon bearing formation at a temperature from 25 to 120° C.

28. The method of claim 27, wherein the composition further comprises a non-chelating amine added in a quantity such that the composition has a pH in the range of 9 to 13.

29. The method of claim 28, wherein the non-chelating amine comprises dimethylaminopropylamine and the dimethylaminopropylamine is operable to provide (a) a pH of around 10.2 at a 1% level in deionized water and (b) a pH of around 10.4 at a 2% level in deionized water.

30. The method of claim 28, wherein the non-chelating amine is operable to increase the alkalinity of the water without any Ca and Mg precipitation.

31. The method of claim 28, wherein the non-chelating amine is selected from an ethanol amine, a di-and tri ethanol amine, a polyalkylene polyamine, a diethylene triamine (DETA). a triethylenetetramine (TETA). and alkoxylates thereof.

32. The method of claim 27, wherein the water is hard brine.

33. The method of claim 27, wherein the agent is selected from the group consisting of ethylenediaminetetraacetic acid (EDTA), ethylenediamine tetracetic acid tetra sodium salt (EDTA Na$_4$), EDTA salts, acrylic polymers, ascorbic acid, tetrasodium iminodisuccinate, citric acid, dicarboxymethylglutamic acid, ethylenediaminedisuccinic acid (EDDS), malic acid, nitrilotriacetic acid (NTA), nonpolar amino acids, methionine, oxalic acid, phosphoric acid, polar amino acids, arginine, asparagine, aspartic acid, glutamic acid, glutamine, lysine, ornithine, siderophores, desferrioxamine B, hydrolysed wool, and succinic acid.

34. The method of claim 27, wherein the ASP solution comprises a water-soluble polymer selected from the group consisting of polyacrylamides, co-polymers of polyacrylamides, or partially hydrolyzed polyacrylamide (HPAM) polymers.

35. The method of claim 27, wherein the ASP solution comprises an anionic surfactant.

36. The method of claim 27, wherein the surfactant is an ether sulfate.

37. The method of claim 27, wherein the water comprises at least 3.5 wt % of the chelating agent EDTA Na$_4$.

38. The method of claim 27, wherein the water comprises divalent cations and the weight ratio of EDTA to the divalent cations is at least about 9:1.

39. The method of claim 27, wherein the agent is at a concentration between about 0.1 wt % to about 10 wt % of the agent in the water.

40. The method of claim 27, wherein the pH of the composition ranges from 9 to 13.

41. The method of claim 27, wherein the pH of the composition is 10.5.

42. A composition for treating a hydrocarbon-hearing formation, said composition comprising:
  a. an alkaline-surfactant-polymer (ASP) solution in water, wherein the water is selected from the group of hard water or hard brine; and
  b. a non-chelating amine added in a quantity such that the composition has a pH in the range from 9 to 13.

43. The composition of claim 42, wherein
  a. the non-chelating amine comprises dimethylaminopropylamine, and
  b. the dimethylaminopropylamine is operable to provide (a) a pH of around 10.2 at a 1% level in deionized water and (b) a pH of around 10.4 at a 2% level in deionized water.

44. The composition of claim 43, wherein the non-chelating amine is operable to increase the alkalinity of the water without any Ca and Mg precipitation.

45. The composition of claim 42, wherein the non-chelating amine is selected from the group consisting of an ethanol amine, a di-and tri ethanol amine, a polyalkylene polyamine, a diethylene triamine (DETA), a triethylenetetramine (TETA), and alkoxylates thereof.

46. A method of treating a hydrocarbon-bearing formation to recover oil comprising:
  a. selecting a composition comprising
    i. an alkaline-surfactant-polymer (ASP) solution in water, wherein the water is selected from the group of hard water or brine; and
    ii. a non-chelating amine added in a quantity such that the composition has a pH in the range from 9 to 13, and
  b. injecting the composition into the hydrocarbon bearing formation at a temperature from 25 to 120° C.

47. The composition of claim 46, wherein the non-chelating amine is dimethylaminopropylamine, which is operable to provide (a) a pH of around 10.2 at a 1% level in deionized water and (b) a pH of around 10.4 at a 2% level in deionized water.

48. The composition of claim 46, wherein the non-chelating amine is operable to increase the alkalinity of the water without any Ca and Mg precipitation.

49. The composition of claim 46, wherein the non-chelating amine is selected from an ethanol amine, a di-and tri ethanol amine, a polyalkylene polyamine, a diethylene triamine (DETA), a triethylenetetramine (TETA), and alkoxylates thereof.

* * * * *

(12) EX PARTE REEXAMINATION CERTIFICATE (10728th)
United States Patent
Weerasooriya et al.

(10) Number: US 8,188,012 C1
(45) Certificate Issued: Oct. 2, 2015

(54) PROCESS OF USING HARD BRINE AT HIGH ALKALINITY FOR ENHANCED OIL RECOVERY (EOR) APPLICATIONS

(75) Inventors: Upali P. Weerasooriya, Austin, TX (US); Gary A. Pope, Cedar Park, TX (US)

(73) Assignee: BOARD OF REGENTS, THE UNIVERSITY OF TEXAS SYSTEM, Austin, TX (US)

Reexamination Request:
No. 90/013,240, May 14, 2014

Reexamination Certificate for:
Patent No.: 8,188,012
Issued: May 29, 2012
Appl. No.: 12/879,231
Filed: Sep. 10, 2010

Related U.S. Application Data (60) Provisional application No. 61/241,191, filed on Sep. 10, 2009, provisional application No. 61/243,025, filed on Sep. 16, 2009.

(51) Int. Cl.
C09K 8/68 (2006.01)
E21B 43/16 (2006.01)
C09K 8/584 (2006.01)

(52) U.S. Cl.
CPC . *C09K 8/584* (2013.01); *C09K 8/68* (2013.01); *E21B 43/16* (2013.01)

(58) Field of Classification Search
None
See application file for complete search history.

(56) References Cited

To view the complete listing of prior art documents cited during the proceeding for Reexamination Control Number 90/013,240, please refer to the USPTO's public Patent Application Information Retrieval (PAIR) system under the Display References tab.

*Primary Examiner* — Jerry D Johnson (57) ABSTRACT

The present invention describes the use of EDTA and/or alkali treated hard brine at high pH for making ASP formulations for EOR applications.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 42-49 is confirmed.

Claims 2 and 15 are cancelled.

Claims 1, 3, 5, 6, 11-13, 23, 27, 28, 31, 36, 37 and 41 are determined to be patentable as amended.

Claims 4, 7-10, 14, 16-22, 24-26, 29, 30, 32-35 and 38-40, dependent on an amended claim, are determined to be patentable.

New claims 50 and 51 are added and determined to be patentable.

1. A composition for treating a hydrocarbon-hearing formation, said composition comprising:
    (a) an alkaline-surfactant-polymer (ASP) solution in water, wherein the water is selected from the group consisting of hard water and hard brine; *and*
    (b) an agent that is a chelating agent and an alkali*;*
    *wherein the composition comprises a non-chelating amine providing alkalinity*.

3. The composition of claim [2] *1*, wherein the water comprises divalent cations selected from the group consisting of $Ca^{++}$ and $Mg^{++}$.

5. The composition of claim [2] *1*, wherein
    a. the non-chelating amine comprises dimethylaminopropylamine, and
    b. the dimethylaminopropylamine is operable to provide (a) a pH of around 10.2 at a 1% level in deionized water and (b) a pH of around 10.4 at a 2% level in deionized water.

6. The composition of claim [2] *1*, wherein the non-chelating amine is selected from the group consisting of an ethanol amine, a di-and tri ethanol amine, a polyalkylene polyamine, a diethylene triamine (DETA), a triethylenetetramine (TETA), alkoxylated derivatives thereof, and combinations thereof.

11. The composition of claim [10] *1*, wherein the [EDTA Na₄] *agent* is at a concentration between about 0.1 wt % to about 10 wt % of the [EDTA Na₄] *agent* in the water.

12. The composition of claim [10] *11*, wherein the water comprises *at least* 3.5 wt % of the [EDTA Na₄] *agent*.

13. The composition of claim 1, wherein *the* ASP solution comprises an anionic surfactant.

23. A method of making a composition for use in treating a hydrocarbon-hearing formation, said method comprising the steps of:
    a. combining an alkaline agent, a surfactant, and a polymer in water to form an alkaline-surfactant-polymer (ASP) solution in the water, wherein the water is selected from the group consisting of hard water and hard brine, and *wherein the alkaline agent comprises a non-chelating amine providing alkalinity;*
    b. adding an agent to the water, wherein the agent is a chelating agent and an alkali;
    c. forming the composition from the combination of the alkaline agent, the surfactant, the polymer, and the agent.

27. A method of treating a hydrocarbon-bearing formation to recover oil comprising:
    a. selecting a composition comprising
        i. an alkaline-surfactant-polymer (ASP) solution in water, wherein the water is selected from the group consisting of hard water and hard brine, and
        ii. an agent *that* is a chelating agent and an alkali,
        *wherein the composition comprises a non-chelating amine providing alkalinity,* and
    b. injecting the composition into the hydrocarbon bearing formation at a temperature from 25° to 120° C.

28. The method of claim 27, wherein the [composition further comprises a] non-chelating amine *is* added in a quantity such that the composition has a pH in the range of 9 to 13.

31. The method of claim 28, wherein the non-chelating amine is selected from an ethanol amine, a di-and tri ethanol amine, a polyalkylene polyamine, a diethylene triamine (DETA)[,] a triethylenetetramine (TETA)[,] and alkoxylates thereof.

36. The method of claim 27, wherein the surfactant is [an ether sulfate] *selected from the group consisting of ether sulfates and salts thereof*.

37. The method of claim 27, wherein the water comprises at least 3.5 wt % of the [chelating] agent [EDTA Na₄].

41. The method of claim 27, wherein the pH of the composition is *from* 10.5 *to* 11.

*50. A method of treating a hydrocarbon-bearing formation to recover oil comprising:*
    *a. selecting a composition comprising*
        *i. an alkaline-surfactant-polymer (ASP) solution in water, wherein the water is selected from the group consisting of hard water and hard brine, and*
        *ii. an agent that is a chelating agent and an alkali, wherein the ASP solution comprises an anionic surfactant selected from the group consisting of ether sulfates and salts thereof, and*
    *b. injecting the composition into the hydrocarbon bearing formation at a temperature from 100° C. to 120° C.*

*51. The method of claim 50, wherein the pH of the composition is from 10.5 to 11.*

\* \* \* \* \*